United States Patent
Neuburger et al.

(10) Patent No.: US 10,622,859 B2
(45) Date of Patent: Apr. 14, 2020

(54) METHOD AND DEVICE FOR OPERATING AN ELECTRIC MACHINE HAVING EXTERNAL OR HYBRID EXCITATION

(75) Inventors: Martin Neuburger, Geislingen (DE); Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 785 days.

(21) Appl. No.: 13/997,869

(22) PCT Filed: Nov. 22, 2011

(86) PCT No.: PCT/EP2011/070650
§ 371 (c)(1),
(2), (4) Date: Jul. 22, 2013

(87) PCT Pub. No.: WO2012/089412
PCT Pub. Date: Jul. 5, 2012

(65) Prior Publication Data
US 2013/0293182 A1  Nov. 7, 2013

(30) Foreign Application Priority Data
Dec. 27, 2010 (DE) .......................... 10 2010 064 177

(51) Int. Cl.
  H02K 3/28 (2006.01)
  H02P 6/10 (2006.01)
  H02P 27/06 (2006.01)
  H02P 25/024 (2016.01)
  H02M 1/00 (2006.01)

(52) U.S. Cl.
  CPC .................. *H02K 3/28* (2013.01); *H02P 6/10* (2013.01); *H02P 25/024* (2016.02); *H02P 27/06* (2013.01); *H02M 2001/009* (2013.01)

(58) Field of Classification Search
  CPC .................... H05B 33/0845; H05B 33/0815
  USPC ... 318/183, 490, 599, 716, 718, 771, 400.36
  See application file for complete search history.

(56) References Cited

U.S. PATENT DOCUMENTS

| 3,374,419 A | * | 3/1968 | Williamson | .............. | H02P 9/38 322/28 |
| 3,509,439 A | * | 4/1970 | Schicht | ..................... | H02P 1/46 318/718 |
| 3,604,963 A | * | 9/1971 | Tawara | ................... | H01L 25/03 310/168 |

(Continued)

FOREIGN PATENT DOCUMENTS

| DE | 1110031 | 6/1961 |
| DE | 102008036831 | 2/2009 |

(Continued)

OTHER PUBLICATIONS

International Search Report for Application No. PCT/EP2011/070650 dated Apr. 3, 2013 (2 pages).

*Primary Examiner* — Eduardo Colon Santana
*Assistant Examiner* — Devon A Joseph
(74) *Attorney, Agent, or Firm* — Michael Best & Friedrich LLP

(57) ABSTRACT

The invention relates to an electronically commutated electric machine (2) comprising: a rotor (21); an exciting winding (6) that is located at the rotor (21) in order to generate or alter a direct magnetic field in the rotor (21); a stator (22) comprising a three- or multi-phase stator winding (23) with phases that can be controlled via phase lines (8). The exciting winding (6) is connected to the stator winding (23).

8 Claims, 3 Drawing Sheets

(56) References Cited

U.S. PATENT DOCUMENTS

| | | | | |
|---|---|---|---|---|
| 3,667,014 | A * | 5/1972 | Merhof | H02P 1/50 318/715 |
| 3,771,046 | A * | 11/1973 | Harter | H02P 9/36 322/63 |
| 3,908,161 | A * | 9/1975 | Messenger | H02K 19/00 290/38 R |
| 3,922,592 | A * | 11/1975 | Quantz | H02J 7/1423 320/123 |
| 4,305,001 | A * | 12/1981 | Vamaraju | H02P 9/42 290/5 |
| 4,835,427 | A * | 5/1989 | Bohm | H01L 25/115 257/687 |
| 5,541,456 | A * | 7/1996 | Maggioni | H02P 9/08 307/10.1 |
| 5,631,544 | A * | 5/1997 | Syverson | H02J 7/1423 322/46 |
| 5,719,486 | A * | 2/1998 | Taniguchi | H02J 7/1438 322/24 |
| 5,751,128 | A * | 5/1998 | Chalupa | H02P 6/18 318/400.05 |
| 5,796,233 | A * | 8/1998 | Satake | H02K 16/00 318/705 |
| 8,368,404 | B2 * | 2/2013 | Wakimoto | G01R 31/34 324/500 |
| 2001/0050540 | A1 * | 12/2001 | Takayama | H02P 6/08 318/599 |
| 2003/0067375 | A1 * | 4/2003 | Hamann | H02K 11/0005 336/174 |
| 2008/0309084 | A1 * | 12/2008 | Murugesan | F01K 15/02 290/3 |
| 2008/0309271 | A1 * | 12/2008 | Pierret | H02P 1/46 318/490 |
| 2009/0121659 | A1 * | 5/2009 | Oyobe | B60L 53/20 318/12 |
| 2011/0062709 | A1 * | 3/2011 | Murugesan | F01K 15/02 290/31 |
| 2014/0132125 | A1 * | 5/2014 | Rieger | H02K 19/12 310/68 C |

FOREIGN PATENT DOCUMENTS

| | | |
|---|---|---|
| JP | S5376315 | 7/1978 |
| JP | 8256497 | 10/1996 |
| JP | 2002272125 | 9/2002 |
| JP | 2003097398 | 4/2003 |
| JP | 2010256244 | 11/2010 |

* cited by examiner

METHOD AND DEVICE FOR OPERATING AN ELECTRIC MACHINE HAVING EXTERNAL OR HYBRID EXCITATION

BACKGROUND OF THE INVENTION

The invention relates to electric machines having external or hybrid excitation, in particular methods for operating electric machines of this type.

Synchronous motors are widely used as electronically commutated electric machines. Said motors are highly suitable for many applications, but, in particular in the partial-load range, have the disadvantage that the field attenuation necessary there is very complicated to realize. In contrast thereto, in the case of electric machines having external or hybrid excitation, the field attenuation is achieved very simply by a reduction of the exciter magnetic field. In the case of electric machines having external excitation, the exciter magnetic field is generated with the aid of a separate exciter winding, while in the case of electric machines having hybrid excitation, the exciter magnetic field is generated both by permanent magnets and with the aid of a separate exciter winding.

The exciter winding serves to direct a static magnetic field at a rotor body which collects the magnetic flux and directs it via the rotor poles 24 in the direction of the stator. In previous motors having external or hybrid excitation, the circuitry outlay is increased on account of the additional exciter winding and, both outside and within the electric machine, a corresponding wiring is necessary in order to provide a direct current through the exciter winding. The outlay during production and use of such electric machines having external or hybrid excitation is significantly increased as a result.

Therefore, it is a object of the present invention to reduce the outlay for interconnecting the exciter winding in electric machines having external or hybrid excitation. Furthermore, it is an object of the invention to provide a method for operating electric machines having external or hybrid excitation.

SUMMARY OF THE INVENTION

This object is achieved by means of the electric machine and by means of the motor systems and the methods for operating an electric machine.

In accordance with the first aspect, an electronically commutated electric machine is provided. The electric machine comprises:
  a rotor;
  an exciter winding arranged at the rotor in order to generate or alter a direct magnetic field in the rotor; and
  a three-phase or polyphase stator winding with phases which can be driven via phase lines;
  wherein the exciter winding is connected to the stator winding.

One concept of the electric machine above consists in realizing the driving of the exciter winding directly via one or a plurality of the winding phases. As a result, it is possible to use existing electrical connections for the phase voltages additionally also for driving the exciter winding. The additional outlay previously required for connecting the exciter winding both outside and within the electric machine can be significantly reduced.

The efficiency of the electric machine above can be increased since less excitation is applied.

Furthermore, the electric machine above is intrinsically safe since it is possible to dispense with arranging a phase isolating relay within the electric machine. In the case of a fault, on account of the simultaneous failure of the energization of the exciter winding, the exciter magnetic field is immediately switched off or—in the case of machines having hybrid excitation—significantly reduced, such that in diverse cases of faults, such as, for example, cable braking, short circuit of the circuit breakers or the like, the electric machine automatically becomes free of torque and, as a result, its intrinsically safe state can be realized without the targeted driving of a switch or the like and without cost-intensive hardware outlay.

Furthermore, the exciter winding can be connectable to a supply potential via an exciter winding line, wherein the exciter winding line is connected in particular to an electrically conductive housing of the electric machine.

In accordance with one embodiment, the exciter winding can be connected to one of the phase lines.

In accordance with a further embodiment, the stator winding has stator coils interconnected in star connection, wherein the exciter winding is connected to a star point of the star connection.

In accordance with a further aspect, a motor system is provided. The motor system comprises:
  the electric machine above in which the exciter winding is connected to one of the phase lines;
  a power stage for providing phase voltages and/or phase currents on the phase lines;
  a control unit for driving the power stage, such that the phase line connected to the exciter winding has a constant phase potential and such that the remaining phase voltages are provided in such a way that in each case sinusoidal voltage profiles arise as differential voltages between the phase lines.

In accordance with a further aspect, a motor system is provided. The motor system comprises:
  the electric machine above in which the stator winding has stator coils interconnected in star connection and in which the exciter winding is connected to a star point of the star connection;
  a power stage for providing phase voltages and/or phase currents on the phase lines;
  a control unit for driving the power stage, such that phase voltages have in each case sinusoidal voltage profiles that are phase-offset with respect to one another.

Furthermore, the control unit can be designed to generate the phase voltages with the aid of a pulse width modulation by varying duty ratios of the pulse width modulation for generating the phase voltages, and to set a current through the exciter winding by applying a duty ratio offset to the duty ratios for all the phase voltages.

In accordance with a further aspect, a method for operating the electric machine above in which the exciter winding is connected to one of the phase lines is provided, wherein a constant phase potential is applied to the phase line connected to the exciter winding, and wherein the remaining phase voltages are provided in such a way that in each case sinusoidal voltage profiles arise as differential voltages between the phase lines.

In accordance with a further aspect, a method for operating the electric machine above is provided in which the stator winding has stator coils interconnected in star connection and in which the exciter winding is connected to a star point of the star connection, wherein the power stage is driven in such a way that the phase voltages have in each case sinusoidal voltage profiles that are phase-offset with respect to one another.

In accordance with one embodiment, the phase voltages can be generated with the aid of a pulse width modulation by the variation of duty ratios of the pulse width modulation for generating the phase voltages, and wherein a current through the exciter winding is set by a duty ratio offset being applied to the duty ratios for all the phase voltages.

BRIEF DESCRIPTION OF THE DRAWINGS

Preferred embodiments of the present invention are explained in greater detail below with reference to the accompanying drawings in which.

DETAILED DESCRIPTION

Figure 1:
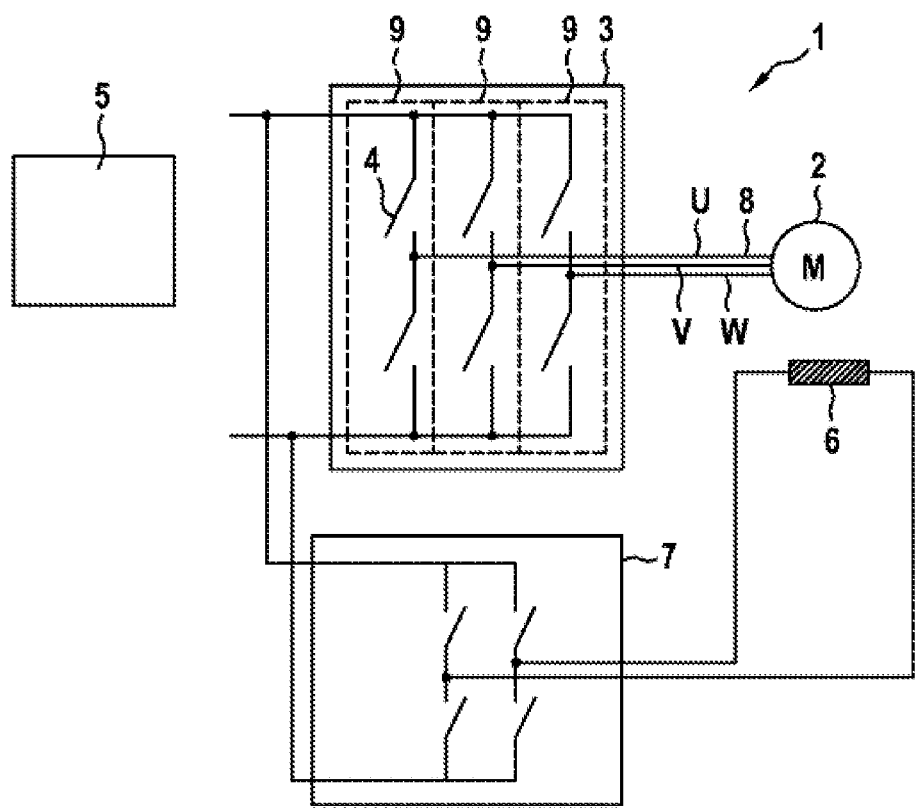
FIG. 1 shows a schematic illustration of a conventional electric machine having external excitation.

FIG. 1 shows a schematic illustration of a motor system 1 for operating an electric machine 2 having external excitation. The electric machine 2 is electronically commutated and has a rotor 21, e.g. in the form of a rotor unit, having rotor poles 24 and a stator 22 having stator teeth directed to the rotor. The motor system has a power stage 3, which is connected to the electric machine 2 via phase lines 8. The power stage 3 provides the phase voltages and/or phase currents for operating the electric machine 2.

In the present exemplary embodiment, the electric machine 2 is of three-phase design, such that the power stage 3 has three inverter circuits 9 in a so-called B6 arrangement. The inverter circuits 9 each have two power semiconductor switches 4 which are connected in series between a high supply potential VH and a low supply potential VL and which can be driven by a control unit 5 for opening or closing i.e. for switching into a non-conducting state or into a conducting state. The power semiconductor switches 4 can be designed for example as thyristors, IGBTs, IGCTs, power CMOS transistors or the like. The phase lines 8 are connected between the power semiconductor switches 4 of the inverter circuits 9.

The electric machine 2 has external or hybrid excitation, that is to say that the exciter magnetic field is provided wholly or partly with the aid of an exciter winding 6. The exciter winding 6 is generally arranged transversely with respect to an axial direction of the electric machine 2 and generates a magnetic field in an axial direction, which is picked up by the rotor 21. The rotor 21 deflects the direction of the picked-up magnetic field in such a way that the latter runs through the rotor poles 24 and emerges from the rotor poles 24 in the direction of the stator teeth.

The exciter winding 6 is supplied with electrical energy via an exciter circuit 7. The exciter circuit 7 is able to apply an adjustable exciter current and/or an adjustable exciter voltage to the exciter winding 6, wherein the exciter voltage and/or the exciter current can be generated by a pulse-width-modulated driving by inverter circuits 9 of the exciter circuit 7.

For driving the electric machine 2, the control unit 5 applies phase voltages to the phase lines 8. The phase voltages are generated for realizing a sinusoidal commutation as three phase-offset sinusoidal voltage profiles which bring about profiles of phase currents IU, IV, IW illustrated by way of example in FIG. 2.

Figure 2:
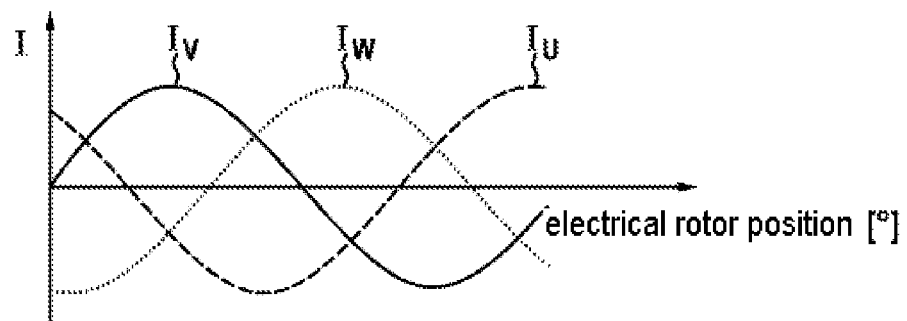
FIG. 2 shows a diagram of the profile of the phase currents during the operation of the electric machine in FIG. 1.

FIG. 2 shows the typical current profile of the phase currents IU, IV, IW for a constant rotation of the electric machine 2 at constant torque. The sinusoidal phase currents are phase-shifted by 120° (electrical rotor position) with respect to one another. In order to generate the phase currents IU, IV, IW whose profiles are illustrated by way of example in FIG. 2, corresponding phase voltages UU, UV, UW or phase potentials can be applied. In this case, the absolute magnitude of the phase potentials is unimportant, however, since the phase currents IU, IV, IW are determined only by the differential voltages between the phases.

Previous electric machines having external excitation have the exciter circuit 7 and the electrical connection between the exciter circuit 7 and exciter winding 6, which, in particular relative to conventional synchronous machines, entails an additional outlay in the construction of electric machines having external excitation or hybrid excitation.

In order to generate the phase voltages UU, UV, UW, the power semiconductor switches 4 are driven by the control unit 5 in accordance with a pulse width modulation. The pulse width modulation makes it possible at any point in time, by rapidly alternating applying the high supply potential VH and the low supply potential VL of the phase line, to predefine a duty ratio, which in principle represents the voltage to be set as a proportion of a supply voltage Usup=VH−VL which is applied to the power stage 3. In order to set a specific phase voltage, in the control unit 5 the duty ratio is predefined as a ratio of the switched-on time duration of the power semiconductor switch 4 (pull-high switch) connected to the high supply potential VH to a defined cycle time duration of the pulse width modulation. During the switched-on time duration, the pull-high switch of the two power semiconductor switches 4 of the relevant inverter circuit 9 is closed in order to output the supply voltage Usup to the phase connection. After the elapsing of the switched-on time duration until the end of the corresponding cycle, the pull-high switch is opened and instead the pull-low switch is closed in order thus to apply a ground potential or the low supply potential VL to the relevant phase connection.

Figure 3:
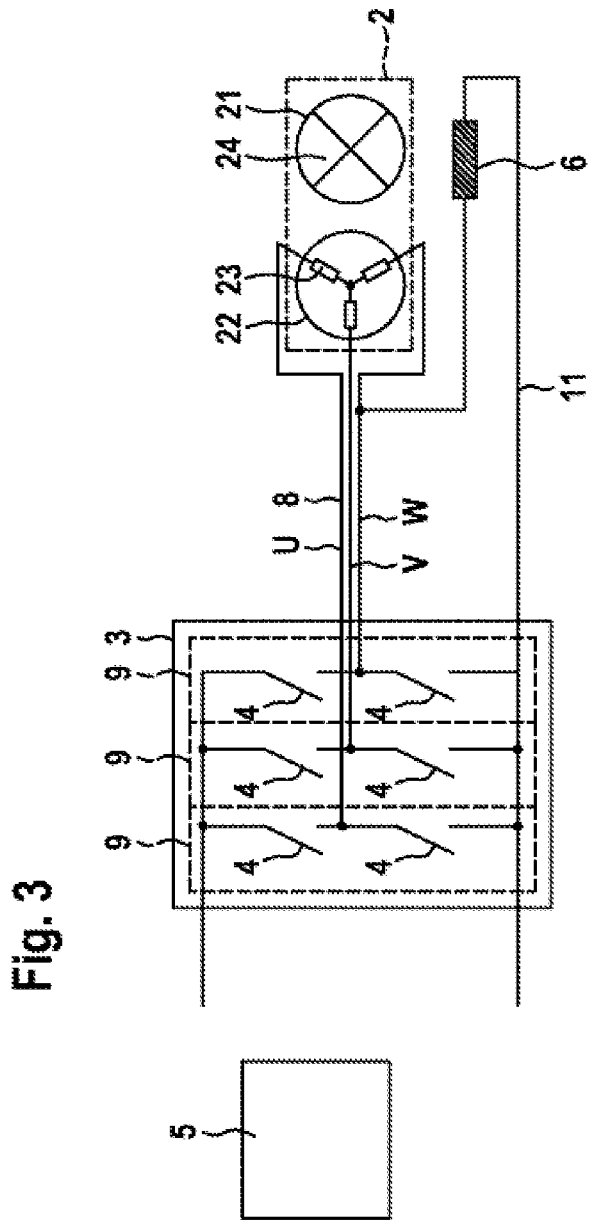
FIG. 3 shows a schematic illustration of an embodiment of the electric machine having external excitation.

FIG. 3 illustrates a schematic illustration of a motor system 10 in which the exciter circuit 7 can be dispensed with and only an exciter winding line 11 for electrically connecting one of the supply potentials, e.g. the low supply potential VL, to the exciter winding 6 is provided. In the embodiment in FIG. 3, which otherwise substantially corresponds to the motor system 1 in FIG. 1, the exciter winding 6 is connected between the low supply potential VL and one of the phase lines 8, in this case the phase line 8 of the phase W.

Driving the exciter winding 6 generally requires a direct current which can be varied only in a manner dependent on the operating point, i.e. significantly more slowly than is the case for the phase voltages UU, UV, UW and/or phase currents IU, IV, IW. In order to provide the exciter direct current through the exciter winding, the driving of the power semiconductor switches 4 of the power stage 3 is now varied such that the inverter circuit 9 assigned to the phase W substantially provides a constant voltage. This voltage can be generated by pulse width modulation with a predefined duty ratio. The duty ratio can be defined by the control unit 5 in a manner dependent on the operating point and determines the strength of the exciter magnetic field generated by the exciter winding 6.

The inverter circuits 9 of the remaining phases U, V are then driven such that, in comparison with the driving corresponding to the three-phase driving illustrated schematically in FIG. 2, the same phase currents IU, IV, IW flow. This is achieved by virtue of the fact that, although the phase voltage UW of the phase W is kept approximately constant, the phase voltages UU, UV are varied such that the differential voltages between the phases U, V, W correspond to those which exist in conventional three-phase operation. In this way, both the exciter winding 6 and the corresponding stator winding 23 of the electric machine 2 can be energized via the phase line 8 of the phase W.

Figure 4:
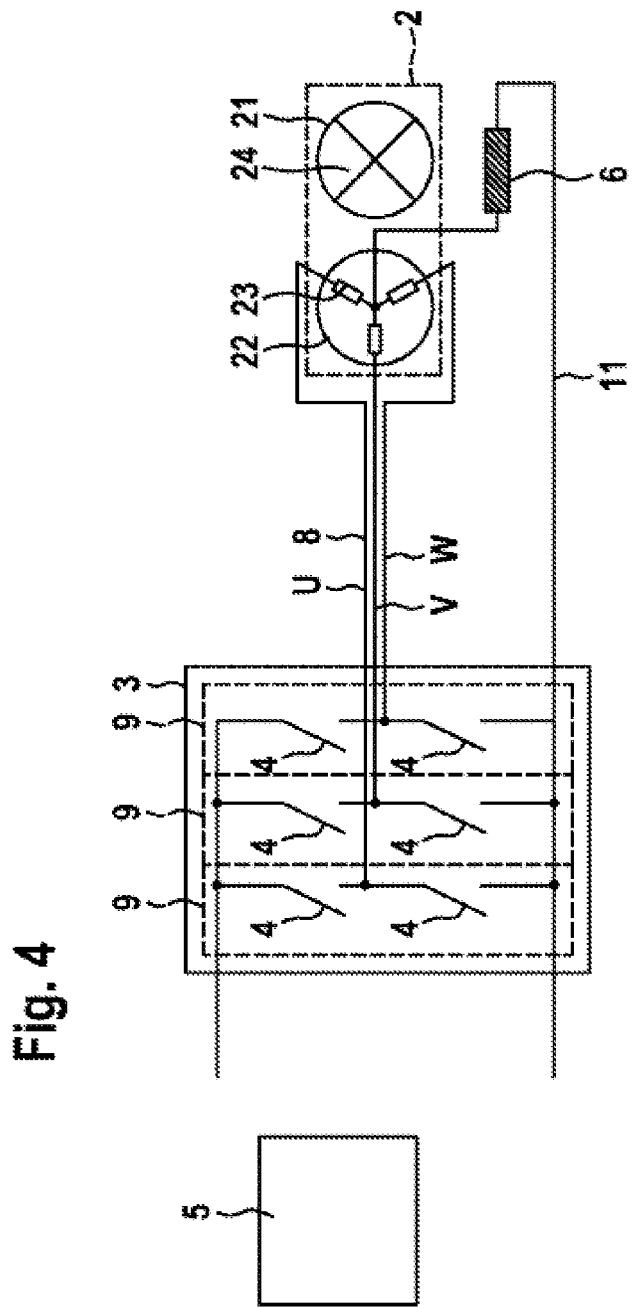
FIG. 4 shows a schematic illustration of a further embodiment of an electric machine having external excitation.

FIG. 4 illustrates a schematic illustration of a further embodiment of the electric machine having external excitation. In contrast to the exemplary embodiment of FIG. 3, here the exciter winding 6 is connected between the low supply potential VL and a star point of the three-phase stator winding 23. With the three-phase driving illustrated as an example by the current profiles in FIG. 2, the star point of the stator winding 23 is generally at a quasi-fixed potential, such that a constant exciter current through the exciter winding 6 can be ensured. In order to set the exciter current, however, the star point potential can be varied by variation of the duty ratios during the driving of the inverter circuits 9 of the power stage 3. The variation of the exciter voltage between the star point of the electric machine and one of the supply potentials can be achieved for example by a specific duty ratio offset being applied to the duty ratios for the pulse-width-modulated driving of each of the inverter circuits 9 of the power stage 3.

It is advantageous if the inductance of the exciter coil is significantly, for example by more than one power of ten, greater than the comparable inductances of the stator windings 23. A thereby indirectly generated low-pass filter of the exciter circuit with a significantly lower cut-off frequency decouples the exciter winding 6 from the inductances of the stator windings 23.

In accordance with a further embodiment, that connection of the exciter winding 6 which is connected to the low supply potential can be connected to the motor ground, which is usually present at the housing. It is thus possible to connect the exciter winding line 11 for connecting the exciter winding 6 directly to the housing, as a result of which the exciter winding lines 11 are also obviated.

The invention claimed is:

1. An electronically commutated electric machine (2), comprising:
    a rotor (21);
    an exciter winding (6) arranged at the rotor (21) in order to generate or alter a direct magnetic field in the rotor (21); and
    a stator (22) having a three-phase or polyphase stator winding (23) with phases which can be driven via phase lines (8) connected to inverter circuits (9);
    wherein the stator winding (23) has stator coils interconnected in a star connection;
    wherein the exciter winding (6) is directly connected to a star point of the star connection of the stator winding (23), and directly to a supply potential via an exciter winding line (11); and
    wherein, to set an exciter winding current, a duty ratio used to drive the inverter circuits (9) is varied to vary a potential of the star point.

2. A motor system (1) comprising:
    an electric machine (2) as claimed in claim 1;
    a power stage (3) for providing phase voltages and/or phase currents on the phase lines (8);
    a control unit (5) for driving the power stage, such that the phase line (8) connected to the exciter winding (6) has a constant phase potential and such that the remaining phase voltages are provided in such a way that in each case sinusoidal voltage profiles arise as differential voltages between the phase lines (8).

3. A motor system (1) comprising:
    an electric machine (2) as claimed in claim 1;
    a power stage (3) for providing phase voltages and/or phase currents on the phase lines (8);
    a control unit (5) for driving the power stage (3), such that phase voltages have in each case sinusoidal voltage profiles that are phase-offset with respect to one another.

4. The motor system (1) as claimed in claim 3, wherein the control unit (5) is designed to generate the phase voltages with the aid of a pulse width modulation by varying duty ratios of the pulse width modulation for generating the phase voltages, and to set a current through the exciter winding by applying a duty ratio offset to the duty ratios for all the phase voltages.

5. Method for operating an electric machine (2) as claimed in claim 1, wherein a constant phase potential is applied to the phase line (8) connected to the exciter winding (6), and wherein the remaining phase voltages are provided in such a way that in each case sinusoidal voltage profiles arise as differential voltages between the phase lines (8).

6. A method for operating an electric machine (2) as claimed in claim 1, wherein the power stage (3) is driven in such a way that phase voltages have in each case sinusoidal voltage profiles that are phase-offset with respect to one another.

7. The method as claimed in claim 6, wherein the phase voltages are generated with the aid of a pulse width modulation by the variation of duty ratios of the pulse width modulation for generating the phase voltages, and wherein a current through the exciter winding (6) is set by a duty ratio offset being applied to the duty ratios for all the phase voltages.

8. The electric machine (2) as claimed in claim 1, wherein the exciter winding line (11) is connected to an electrically conductive housing of the electric machine (2).

* * * * *